United States Patent Office 3,000,883
Patented Sept. 19, 1961

3,000,883
PREPARATION OF 17α-HYDROXYPROGESTERONE AND INTERMEDIATES
Raymond L. Pederson, Kalamazoo, Mich., assignor to The Upjohn Company, Kalamazoo, Mich., a corporation of Michigan
No Drawing. Filed Mar. 18, 1957, Ser. No. 646,562
1 Claim. (Cl. 260—239.55)

This invention relates to a method for preparing 17α-hydroxyprogesterone by novel selective chemical methods, and relates in particular to a method for synthesizing 17α-hydroxyprogesterone from 3-ketobisnor-4,17(20)-choladien-22-al. It relates further to a novel intermediate compound occurring in the same synthesis.

The 17-acylates of 17α-hydroxyprogesterone are known valuable pharmaceutical compounds possessing progestational properties. This invention provides a synthesis of the former compounds from a starting material that is in relatively plentiful supply whereas previous known methods for its synthesis involved rare and expensive starting materials.

The novel synthesis of this invention involves the use of 3-ketobisnor-4,17(20)-choladien-22-al, available by hydrolysis of the bromine addition product of 22-(1-piperidyl)-bisnor-4,20(22)-choladien-3-one. The latter compound is described by Herr and Heyl in J. Am. Chem. Soc. 74, 3627 (1952). The bromine addition product, which will be described hereinafter, upon hydrolysis yields 3-keto-20-bromobisnor-4-cholen-22-al which on dehydrohalogenation gives 3-ketobisnor-4,17(20)-choladien-22-al.

The reaction of this invention proceeds in accordance with the following reaction scheme:

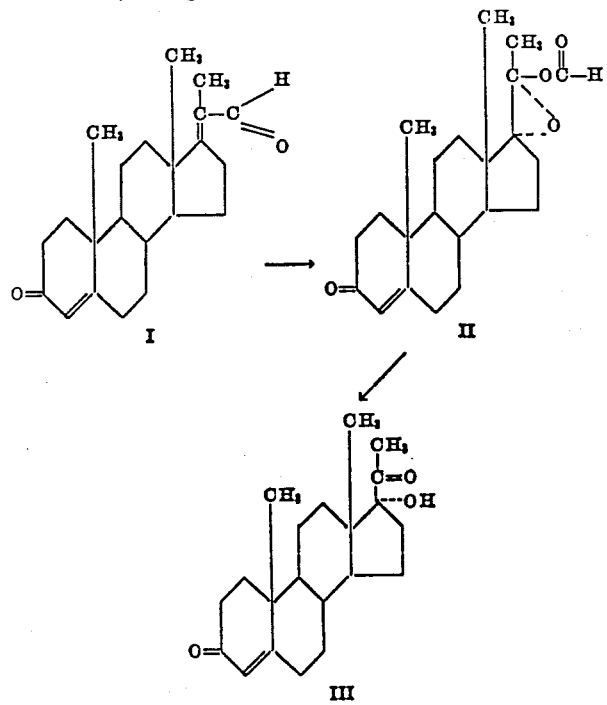

The reaction can be carried out in a single stage without isolation of the novel intermediate, compound II, as will be illustrated in the examples which follow. Nevertheless, isolation of the intermediate compound possesses the advantage of more precise control over the reaction and affords in some cases a more facile isolation of the final product (III). Moreover, compound II is useful as an intermediate in the synthesis of other steroid compounds, since it possesses functional groups known to be useful and operative in the preparation of steroid derivatives.

In general, the reaction is a selective oxidation wherein I is oxidized with an oxidizer such as an organic carboxylic peracid, in an inert organic reaction medium. At least two equivalents of the peracid are employed, two equivalents being the amount theoretically required. In practice, an excess of peracid gives best results, the amount ranging up to seven equivalents. Examples of peracids which can be used are perbenzoic acid, perphthalic acid, performic acid, percamphoric acid, and other organic carboxylic peracids as are known in the art.

The medium employed as described above is an inert organic medium such as chloroform, trichloroethylene, benzene, toluene, methylene dichloride, ethyl acetate, and the like, which can be used alone or in admixture. The temperature of the reaction can vary from minus forty degrees centigrade to plus thirty degrees centigrade, depending upon the rate of reaction desired and upon the particular peracid employed; the different peracids being of different activity as oxidizers as is known in the art. After the reaction is complete, the reaction mixture can be neutralized with a base, preferably an inorganic base, such as an oxide, hydroxide, or carbonate of an alkali metal or an alkaline earth metal. After neutralization the reaction mixture is dried, and the product recovered by separation of the reaction medium as by evaporation under reduced pressure. Purification of the crude product can be carried out by recrystallization or by chromatographic methods by known methods.

Intermediate compound II can be recovered as a direct product of the oxidation if the reaction medium is kept under substantially non-hydrolyzing conditions, i.e., substantially free of water or water-yielding materials, and if the excess acid at the end of the reaction is neutralized with an anhydrous base. Compound II is recoverable as a crystalline compound and can be hydrolyzed to compound III using an aqueous acid or base as will be described in the following examples.

The following preparation and examples are illustrative of the process and products of the present invention, but are not to be construed as limiting.

PREPARATION

*3-ketobisnor-4,17(20)-choladien-22-al*

A solution containing 16.75 grams (forty millimoles) of 22-(1-piperidyl)-bisnor-4,20(22)-choladien-3-one in 800 milliliters of methylene chloride was cooled to minus 55 degrees centigrade, using a Dry Ice-acetone bath. To this was added a solution containing 6.74 grams (42 millimoles) of bromine in eighty milliliters of methylene chloride; the solution was stirred throughout the addition and the temperature was kept at about minus 55 degrees centigrade. The reaction mixture was warmed to about zero degrees centigrade, 100 milliliters of water was added and the reaction mixture was stirred vigorously for a period of two hours. The layers were separated, and the organic layer was washed twice with 100-milliliter portions of water. After drying the organic layer, twenty milliliters of pyridine was added and then the methylene chloride was distilled at reduced pressure. An additional eighty milliliters of pyridine was added; the solution was then warmed to seventy degrees centigrade for one hour, and on the steam bath for 0.5 hour. Distillation at reduced pressure left a syrupy residue containing a trace of pyridine. This residue was dissolved in 200 milliliters of methylene chloride, and washed twice with ten percent hydrochloric acid, once with five percent sodium carbonate, and water. Evaporation of the methylene chloride yielded 12.46 grams, melting point 132 to 137 degrees centigrade, $$a_m \, \substack{slc \\ 248} \, 27,584$$

Chromatography over synthetic magnesium silicate and subsequent crystallization from acetone gave pure 3-ketobisnor-4,17(20)-choladien-22-al, melting point 139 to 141 degrees centigrade, $$\lambda_{max}^{alc.} \, 248.5 m\mu$$

$a_m$ 27,850, $[\alpha]_D$ equal plus 113 degrees (c. 1.186 in $CHCl_3$).

Analysis:
 Calculated for $C_{22}H_{30}O_2$: C, 80.93; H, 9.26
 Found:
  C, 81.01; H, 8.98
  C, 80.87; H, 9.23

EXAMPLE 1

*17α-hydroxyprogesterone*

A solution containing 6.50 grams (0.02 gram mole) of 3-ketobisnor-4,17(20)-choladien-22-al, thirty milliliters of dry benzene, and fifty milliliters of ethyl acetate was cooled to about fifteen degrees centigrade. While stirring and cooling, 8.0 milliliters of forty percent peracetic acid was added. After fifteen minutes the reaction mixture was allowed to warm to room temperature (25 degrees centigrade) for twenty hours. The solution was diluted with fifty milliliters of ethyl acetate, washed with excess five percent sodium bicarbonate, water and dried over sodium sulfate. After evaporating the solvent, the crude product was dissolved in 100 milliliters of methylene chloride; 100 milliliters of Skellysolve B hexanes were added and the solution was adsorbed on 250 grams of synthetic magnesium silicate. Elution with acetone:Skellysolve B hexanes::1:19 using 230-milliliter fractions gave crystalline product in fractions 15–34. Fractions 17–31 were combined (weight=1.00 gram) and crystallized from acetone to give 0.54 gram of 17α-hydroxyprogesterone, melting point 221 to 223 degrees centigrade. A mixed melting point with an authentic sample (melting point 224 to 226) was 221 to 223 degrees centigrade. The infrared absorption spectrum of a chloroform solution was identical to the known spectrum. $[\alpha]_D$ equals plus 94 degrees in $CHCl_3$.

Analysis:
 Calculated for $C_{21}H_{30}O_3$: C, 76.31; H, 9.15
 Found: C, 76.31; H, 9.23.

EXAMPLE 2

*17α-hydroxyprogesterone*

A solution containing 3.26 grams of 3-ketobisnor-4,17(20)-choladien-22-al in fifty milliliters of chloroform was cooled to about three degrees centigrade. While stirring and cooling, there was added 3.2 milliliters of a peracetic acid solution containing 0.02 mole of peracetic acid, and the reaction mixture was allowed to stand at about five degrees centigrade for a period of 7.5 hours. The reaction mixture was washed with cold five percent sodium bicarbonate, water, was dried over sodium sulfate and filtered and was concentrated in vacuo to a syrupy residue. The residue was dissolved in twenty milliliters of ethyl alcohol and six milliliters of a ten percent sodium hydroxide solution was added. After two hours the hydrolysis mixture was acidified with acetic acid and was concentrated in vacuo to about ten milliliters. After cooling and filtering, there was obtained 1.48 grams of crude crystalline 17α-hydroxyprogesterone. Recrystallization from about three milliliters of acetone gave 0.40 gram, melting point 212 to 215 degrees centigrade.

EXAMPLE 3

*17α-hydroxyprogesterone*

A mixture containing 1.63 grams of 3-ketobisnor-4,17(20)-choladien-22-al and ten milliliters of benzene was cooled to about fifteen degrees centigrade, and 43 milliliters of a 0.30 molar perbenzoic acid solution in benzene was added. After 21 hours at room temperature, the reaction mixture was washed with five percent bicarbonate, water, and was dried over sodium sulfate and filtered. Evaporation of the solvent left 1.90 grams of intermediate product. The intermediate product was dissolved in fifty milliliters of ethyl alcohol and ten milliliters of a ten percent sodium hydroxide solution was added. After two hours the reaction mixture was acidified with acetic acid and was concentrated in vacuo to about fifteen milliliters. After cooling and filtering there was obtained 0.35 gram of 17α-hydroxyprogesterone, melting point 200 to 205 degrees centigrade. Recrystallization from acetone gave 0.19 gram of 17α-hydroxyprogesterone, melting point 221 to 223 degrees centigrade. The infrared absorption spectrum of a chloroform solution was identical to the known spectrum.

EXAMPLE 4

*3-keto-17(20)-epoxy-4-pregnen-20-ol, 20-formate*

A solution containing 1.63 grams of 3-ketobisnor-4,17(20)-choladien-22-al in ten milliliters of chloroform was cooled to about five degrees centigrade, and 43 milliliters of 0.30 molar perbenzoic acid solution in benzene was added. The reaction mixture was kept at about five degrees centigrade for a period of 21 hours. The reaction mixture was diluted with fifty milliliters of Skellysolve B hexanes, and was treated with about twenty grams of anhydrous sodium carbonate. After filtering, the product was adsorbed on sixty grams of synthetic magnesium silicate and eluted using seventy milliliter fractions as follows:

Fractions 1–23—Acetone:Skellysolve B hexanes::3:97
Fractions 25–35—Acetone:Skellysolve B hexanes::4:96

Fractions 23–31 (combined weight 0.32 gram) were crystallized from a methylene chloride Skellysolve B hexanes mixture to give 0.07 gram, melting point 164 to 166 degrees centigrade, $$\lambda_{max}^{alc.} \, 241 m\mu$$

The infrared absorption spectrum of a three percent solution in chloroform: 1165 cm.$^{-1}$

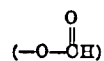

1612 cm.$^{-1}$ (C=C), 1665 cm.$^{-1}$ (conjugated >C=O), 1724 cm.$^{-1}$ (ester carbonyl).

Analysis:
 Calculated for $C_{22}H_{30}O_4$: C, 73.71; H, 8.43
 Found: C, 73.98; H, 8.36

EXAMPLE 5

*Hydrolysis of 3-keto-17(20)-epoxy-4-pregnen-20-ol, 20-formate*

To a solution containing twenty milligrams of 3-keto-17(20)-epoxy-4-pregnen-20-ol, 20-formate in 0.7 milliliter of 95 percent alcohol was added 0.15 milliliter of a ten percent sodium hydroxide solution. After two hours the reaction mixture was acidified with acetic acid and was concentrated by blowing nitrogen over the liquid surface until crystallization began. The reaction product was cooled and filtered to give thirteen milligrams of 17α-hydroxyprogesterone, melting point 221 to 223 degrees centigrade. The infrared absorption spectrum of a chloroform solution was identical to the known spectrum.

It is to be understood that the invention is not to be limited to the exact details of operation or exact compounds shown and described, as obvious modifications and equivalents will be apparent to one skilled in the art, and the invention is therefore to be limited only by the scope of the appended claim.

I claim:

3-keto-17(20)-epoxy-4-pregnen-20-ol, 20-formate.

References Cited in the file of this patent

UNITED STATES PATENTS

| | | |
|---|---|---|
| 2,265,143 | Butenandt | Dec. 9, 1941 |
| 2,777,843 | Chemerda | Jan. 15, 1957 |
| 2,873,272 | Fonken et al. | Feb. 10, 1959 |